(12) United States Patent
Dvir et al.

(10) Patent No.: US 6,557,001 B1
(45) Date of Patent: Apr. 29, 2003

(54) METHOD FOR ENHANCING VIDEO COMPRESSION THROUGH AUTOMATIC DATA ANALYSIS AND PROFILE SELECTION

(75) Inventors: Ira Dvir, Tel Aviv (IL); Yoav Medan, Haifa (IL)

(73) Assignee: Moonlight Cordless Ltd., Ramat Gan (IL)

(*) Notice: Subject to any disclaimer, the term of this patent is extended or adjusted under 35 U.S.C. 154(b) by 0 days.

(21) Appl. No.: 09/438,500

(22) Filed: Nov. 12, 1999

Related U.S. Application Data

(63) Continuation-in-part of application No. 09/197,441, filed on Nov. 23, 1998.

(51) Int. Cl.[7] .............................................. G06F 17/30
(52) U.S. Cl. ...................................................... 707/101
(58) Field of Search .......................... 707/3, 101, 104.1, 707/500, 500.1; 370/465; 375/240; 345/502, 723; 709/200, 217, 231

(56) References Cited

U.S. PATENT DOCUMENTS 5,706,290 A * 1/1998 Shaw et al. .................. 345/723
6,202,060 B1 * 3/2001 Tran ........................... 707/104.1
6,356,945 B1 * 3/2002 Shaw et al. .................. 375/240

* cited by examiner

Primary Examiner—Diane D. Mizrahi
Assistant Examiner—Apu Mofiz
(74) Attorney, Agent, or Firm—G. E. Ehrlich Ltd.

(57) ABSTRACT

A system and method for rapid video data compression and transmission for a wireless remote monitor. The compression method is adjusted according to the type of software application which generated the video data, and according to the characteristics of the data itself. Preferably, the type and profile of video data compression is selected by a profile manager, which detects the characteristics of the video data to determine the character of the data, and then which selects the video data compression method and profile according to the video data character. The compression method and system may be used with a device for remotely displaying information from a monitor of a main computer and for remotely and fully controlling the main computer.

26 Claims, 5 Drawing Sheets

Internal implementation

Internal implementation

External Analog RGB implementation

External DVI implementation

METHOD FOR ENHANCING VIDEO COMPRESSION THROUGH AUTOMATIC DATA ANALYSIS AND PROFILE SELECTION

This is a Continuation-in-Part pending Appliction of U.S. patent application Ser. No. 09/197,441, filed Nov. 23, 1998, which is currently pending and the specification for which is hereby incorporated by reference as if fully set forth herein.

FIELD AND BACKGROUND OF THE INVENTION

The present invention relates to a system and method for multimedia data compression and transmission, thereby enabling a large amount of multimedia information to be rapidly transmitted for display by a remote display device with low bandwidth requirements. Such multimedia information may optionally include video stream data and/or audio stream data, for example.

Computers are becoming more popular as home entertainment devices and for the organization and display of information for the consumer. In addition to the functions of earlier computers, computers today can play music stored in a variety of formats, including files stored in the MP3 format on a CD, on magnetic storage medium or on the DVD storage medium, as well as displaying video streams and enabling "chats" to take place through the Internet. In addition, consumers can now perform a variety of tasks "online" through the computer, such as order groceries from the local supermarket, which are then delivered to the house of the consumer. These applications have the advantage of being more efficient and of saving the consumer time.

The computer itself has been sufficiently adapted for the household environment and for the new multi-media tasks, except for portability. The typical household computer is a "desktop" computer which is not very portable. However, certain applications such as playing and managing a musical database or otherwise interacting with the computer from a remote location would be more efficient if the computer could easily be moved from room to room. Thus, desktop computers are not sufficiently portable for such tasks.

A more useful solution would enable the consumer to view the display of the monitor of the computer for video data, and/or to also be able to hear the audio data, for interacting with the computer anywhere in the house, as a remote application. The entire computer would not need to be moved about from room to room, but only those portions which are required for controlling the computer and for displaying information on the monitor. Unfortunately, those remote computing solutions which are available only enable partial control, and do not permit portions of the computer to be operated in a fully remote and independent fashion, while still remaining tied to the CPU of the computer but without the necessity for an additional network connection.

The remote computing device disclosed and claimed in pending U.S. patent application Ser. No. 09/197,441, incorporated by reference as if fully set forth herein, overcomes these problems by providing a fully remote, independently operatable device for displaying information on the monitor of a remote mobile platform and for controlling the CPU of the remote computer. However, in order to be fully practicable and realizable, the disclosed device must be able to receive video data sufficiently rapidly in order for the monitor display to be rapidly refreshed, and to receive the audio stream data rapidly for playing such data through speakers in a responsive manner, without requiring the user to wait for long periods of time between requesting the display of a particular type of information and the actual display thereof.

Currently available technologies for transmitting such video data to, and receiving such video data by, a remote monitor, particularly for such a device which is not connected to the controlling CPU through a wire or cable network, are limited in terms of the amount of bandwidth. Such a limitation is typically 100–1,600 Mbps. Therefore, multimedia data compression methods are required in order to compress a larger amount of data into the bandwidth available for transmission. However, current multimedia data compression methods are most efficient when adjusted for the type of multimedia data being transmitted. If a particular device routinely transmits a certain type of multimedia data, then the compression method is fairly simple to determine, as this method could be adjusted to the type of multimedia data. For devices and applications in which multiple types of multimedia data are transmitted, the compression method must be determined separately for each type of data.

The remote monitor of pending U.S. patent application Ser. No. 09/197,441 is an example of a device which must routinely receive multiple different types of video data. All of the display data which is received by this remote monitor is video data, but could range from a display of a GUI (graphical user interface) for a word processing software program, to streaming video data for a DVD movie. Each different type of display data therefore requires a different type of video data compression method for the most efficient compression of the transmitted data.

Currently, each multimedia data compression method must be manually adjusted for the particular type of multimedia data. Clearly, such manual adjustments are not suitable for the remote monitor device, which may rapidly display multiple types of multimedia data. Therefore, a better solution would enable the type of multimedia data compression method to be automatically selected according to the type of multimedia data which is to be displayed on the remote monitor. Unfortunately, such a solution is not currently available.

Therefore, there is an unmet need for, and it would be highly useful to have, a method and a system for automatically selecting a particular type of multimedia data compression method, according to the type of multimedia data which is to be transmitted, such that manual intervention is not required, and such that the multimedia data is efficiently compressed.

SUMMARY OF THE INVENTION

The present invention is of a system and method for rapid multimedia data compression and transmission for a wireless remote monitor. The method of multimedia data compression according to the present invention adjusts the compression method according to the type of software application which generated the multimedia data, and hence according to the characteristics of the data itself. Preferably, the type of multimedia data compression is selected by a profile manager, which detects the characteristics of the multimedia data to determine the character of the data, and then which selects the multimedia data compression profile, including the compression method according to the character of the data.

According to the present invention, there is provided a method for compressing multimedia data, the steps of the method being performed by a data processor, the method comprising the steps of: (a) providing a plurality of different multimedia data compression procedures, each of the compression procedures being associated with a profile of characteristics of the multimedia data; (b) receiving the multimedia data to be compressed to form received data; (c) determining at least one characteristic of the received data; (d) selecting a profile according to the at least one characteristic; and (e) compressing the received data according to a compression procedure associated with the profile.

According to another embodiment of the present invention, there is provided a method for compressing multimedia data, the steps of the method being performed by a data processor, the method comprising the steps of: (a) analyzing each type of multimedia data to determine at least one characteristic of each type of multimedia data; (b) associating one of a plurality of different multimedia data compression procedures with each type of multimedia data according to the at least one characteristic for optimal compression of the multimedia data to form the compression profile; (c) receiving the multimedia data for compression to form compressed data; and (d) selecting the compression profile for compressing the compressed data.

Hereinafter, the term "computer" indicates any type of electronic device which is capable of performing computations, including, but not limited to, personal computers (PC) having an operating system such as DOS, Windows™, OS/2™ or Linux; Macintosh™ computers; computers having JAVA™-OS or BeOS™ as the operating system; thin client computers; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device, portable device for data processing such as a PDA (personal data assistant), or embedded system or device; or any other known and available operating system and computational device. Hereinafter, the term "Windows™" includes but is not limited to Windows95™, Windows 3.x™ in which "x" is an integer such as "1", Windows NT™, Windows98™, Windows CE™, Windows2000™, and any upgraded versions of these operating systems by Microsoft Corp. (USA).

The method of the present invention could also be described as a plurality of instructions being performed by a data processor, such that the method of the present invention could be implemented as hardware, software, firmware or a combination thereof. For the present invention, a software application could be written in substantially any suitable programming language, which could easily be selected by one of ordinary skill in the art. The programming language chosen should be compatible with the computer according to which the software application is executed. Examples of suitable programming languages include, but are not limited to, C, C++ and Java.

Hereinafter, the term "CPU" (central processing unit) includes those portions of the computer which control the remainder of the computer, including the peripherals. As defined herein, the CPU includes the control unit and the arithmetic and logic unit (ALU), as well as other components such as memory and temporary buffers which are required for the operation of the control unit and the ALU. Other types of microprocessors or data processors are specifically excluded from the term "CPU" as herein defined.

Hereinafter, the term "speaker" is defined to include any type of device for producing an audible sound stream for a user, including an earphone.

Hereinafter, a "locally connectable" video card is a video card which is capable of controlling a monitor or other display device which is attached to the computer in which the video card is located, regardless of whether the computer actually has such a monitor or other display device attached.

BRIEF DESCRIPTION OF THE DRAWINGS

The invention is herein described, by way of example only, with reference to the accompanying drawings, wherein:

FIG. 1A is a schematic block diagram illustrating an exemplary system according to the present invention for compressing video or multimedia data, while

DESCRIPTION OF THE PREFERRED EMBODIMENTS

The present invention is of a system and method for rapid multimedia data compression and transmission for a wireless remote monitor. The method of multimedia data compression according to the present invention adjusts the compression method according to the type of software application which generated the multimedia data, and hence according to the characteristics of the data itself. Preferably, the type of multimedia data compression is selected by a profile manager, which detects the characteristics of the multimedia data to determine the profile of the data, and then which selects the multimedia data compression method according to the profile.

The principles and operation of the system and method according to the present invention may be better understood with reference to the drawings and the accompanying description.

Figure 1A:
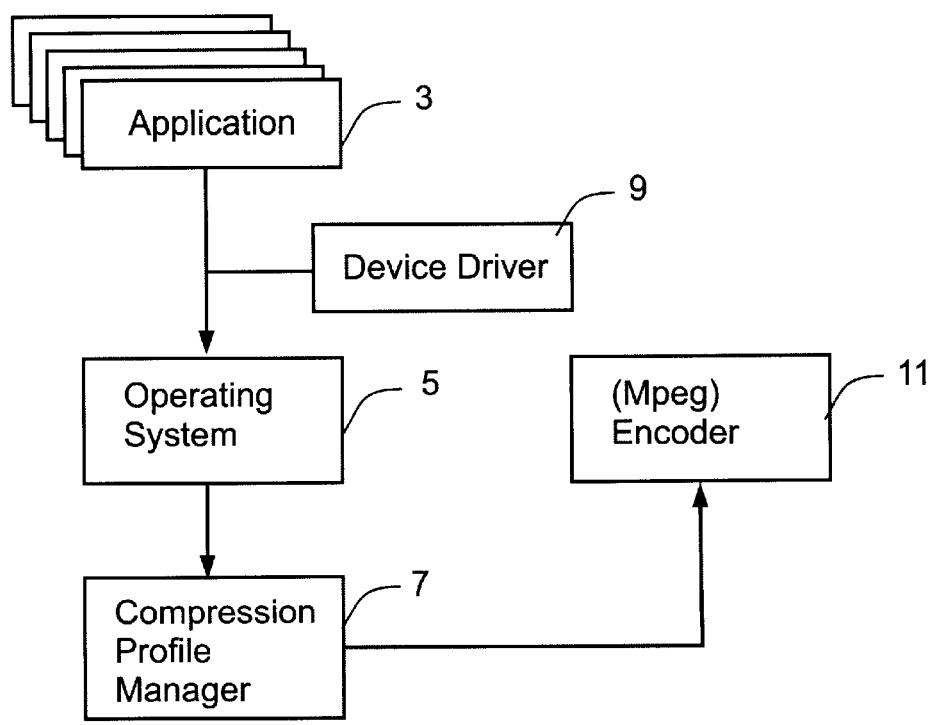
Figure 1B:
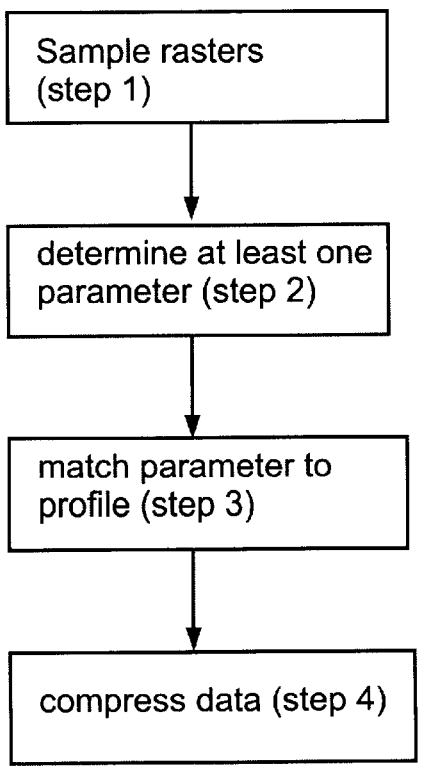
FIG. 1B is a flowchart of an exemplary method for analyzing the data.

Referring now to the drawings, FIG. 1A is a schematic block diagram illustrating an exemplary system according to the present invention, while FIG. 1B is a flowchart of an exemplary method according to the present invention. Although FIGS. 1A and 1B are drawn toward video compression methods, it is understood that this is for the purposes of description only, without any intention of being limiting in any way.

As shown in FIG. 1A, a system 1 features a plurality of software applications 3 for producing different types of display data. Software applications 3 are operated by an operating system 5. The display data must be compressed according to a suitable video compression method before transmission decompression and display, for example by the remote monitor of FIG. 2, and for the systems of FIGS. 3A–3B.

In order for the data to be suitably compressed, the video compression method must be selected to be compatible with the particular type of data produced by each software application 3. Therefore, operating system 5 feeds the display data to a compression profile manager 7. The process is controlled by a separate reporting device driver 9, for causing operating system 5 to report the type of each software application 3 which is running to compression profile manager 7. Preferably, reporting device driver 9 also causes operating system 5 to report the screen resolution to compression profile manager 7.

Once compression profile manager 7 has received the pertinent information concerning the type of video display data which is being produced, compression profile manager 7 can select the particular type of video compression method for compressing the display data. Compression profile manager 7 has a plurality of compression profiles, each of which is suitable for a particular type of display data which is produced by a particular software application 3. As each type of display data is passed from operating system 5, compression profile manager 7 selects a suitable compression profile for compressing the video data, according to the characteristics of the display data, as described in greater detail with regard to FIG. 1B. Alternatively, the user can manually select a compression profile from a plurality of such profiles provided by compression profile manager 7.

Once the proper compression profile for the display data is selected, the actual process of compression is performed by an MPEG (Motion Picture Expert Group) encoder 11 or other type of compression algorithm. It is understood that although the present invention is described with regard to a particular type of video data compression method, namely the MPEG group of compression methods, this is only for the purposes of description and is not intended to be limiting in any way.

For example, different compression profiles would be required for television video stream, a word processing screen stream, a three-dimensional video game video stream, and so forth. Preferably, an automatic video content analysis method would be employed to analyze the type of video data and would select a particular compression profile according to the type of video data. A preferred implementation of such an automatic method is given in FIG. 1B. In step 1, the video data to be transmitted is analyzed. For example, groups of rasters of the video data are optionally sampled for analysis. Preferably, each such group is a block of 8×8 pixels.

In step 2, at least one parameter is determined for each sample. Preferably, the parameter includes, but is not limited to, a number of unique colors in the screen, a presence of static dark thin rows of pixels or large static blocks, and a level of motion in the screen between one frame and the next frame. More preferably, a plurality of such parameters is analyzed.

In step 3, the plurality of parameters is matched to a particular compression profile, which is then selected by compression profile manager 7. For example, the presence of thousands of unique colors in a frame with considerable movement between frames, as well as unchanged black stripes at the bottom and top of each frame, would indicate that a DVD movie is being transmitted. The appropriate compression profile for the DVD movie would then be selected.

The compression profile would be adjusted according to such factors as the maximum resolution, refresh rate and color handling. Optionally and preferably, for text data, a variable bit rate is used for the compression, since the amount of text data which must be transmitted at any particular moment is itself variable. Therefore, the MPEG compression methods are preferred for the present invention as they feature different profiles and levels which are adjusted according to these different factors. The MPEG encoder is also preferred as it enables noise to be filtered through different "filters", such as low-pass, median and deinterlacing filters. The motion vector may also be set, for example by enlarging or minimizing the search area of the data which has changed position within the frame.

Regardless of the level and profile, the MPEG format uses three different types of frames: I, B and P frames. The I frame is the initial or "intra-frame" and is required. The B frame is a bi-directional frame, while the P frame is a predictable frame. The B and P frames are optional, and B frames can be removed without P frames.

These different types of frames are organized into groups. For example, a video stream compressed according to the MPEG method could feature a 3 frame group, such as IBP for example, or a 9 frame group, such as IBBPBBPBB for example, or even a 12 frame group, such as IPPPPPPPPPPP for example. In each group, there is a single I frame, while the number of B and P frames in each group may vary, or even may be deleted altogether. In addition, the number of frames per second, the motion vectors, the resolution, and the filters, may all optionally be adjusted in order to produce each compression profile.

An exemplary compression profile for a television video stream would feature a main level, main profile MPEG-2 compression method with frame groups of 12 frames: IBB PBB PBB PBB. The method would feature progressive encoding, or deinterlacing, and low pass filtering. The motion vectors would be 32×32 for the P frames and 16×16 for the B frames.

On the other hand, an exemplary compression profile for a word processing screen stream at a 800×600 resolution would be high profile, high level variable MPEG-2 stream with frame groups of 9 frames: IBB PBB PBB. In cases where flawless quality is necessary all of the B frames could be omitted, such that a rate of 30 frames per second becomes a rate of 10 tripled frames per second. The motion vectors are 24×24 for the P frames and 8×8 for the B frames. No filters are applied.

For the 3-D video game video data, an exemplary compression profile would optionally feature a high profile, high level MPEG-2 compression method at 60 frames per second, thereby halving the delay caused by the compression process itself. Preferably, the compression method would feature groups of 18 frames: IBPBPBPBPBPBPBPBPB. All of the B frames are deleted, such that a frame rate of 60 frames per second becomes a rate of 30 doubled frames per second. The motion vectors are 48×48 for the P frames and 8×8 for the B frames.

In step 4, the compression profile is set to determine the particular video compression method for compressing the video data. The data is then compressed and transmitted.

Of course, the previously described system and method could be extended to other types of multimedia data, such as audio stream data for example. Alternatively, as previously described, the compression profile could be manually selected by the user, or alternatively could be determined automatically according to the identity of the software application which is producing the video data and/or other types of multimedia data. Two or more of the elements of automatic analysis according to a software module or other set of electronically executed instructions, manual selection by the user, and selection according to the identity of the software application which produces the multimedia data, can also optionally be combined. Optionally and most preferably, the user is able to manually override any automatically selected compression profile, and to replace such an automatically selected compression profile with a different compression profile. Preferably, such a replacement is enabled through a GUI (graphical user interface) element, preferably with the use of a macro command. A ruler or other display of macro buttons such as "tv" "dvd" "text" or "graphics" could be used for controlling these macro commands.

Figure 2:
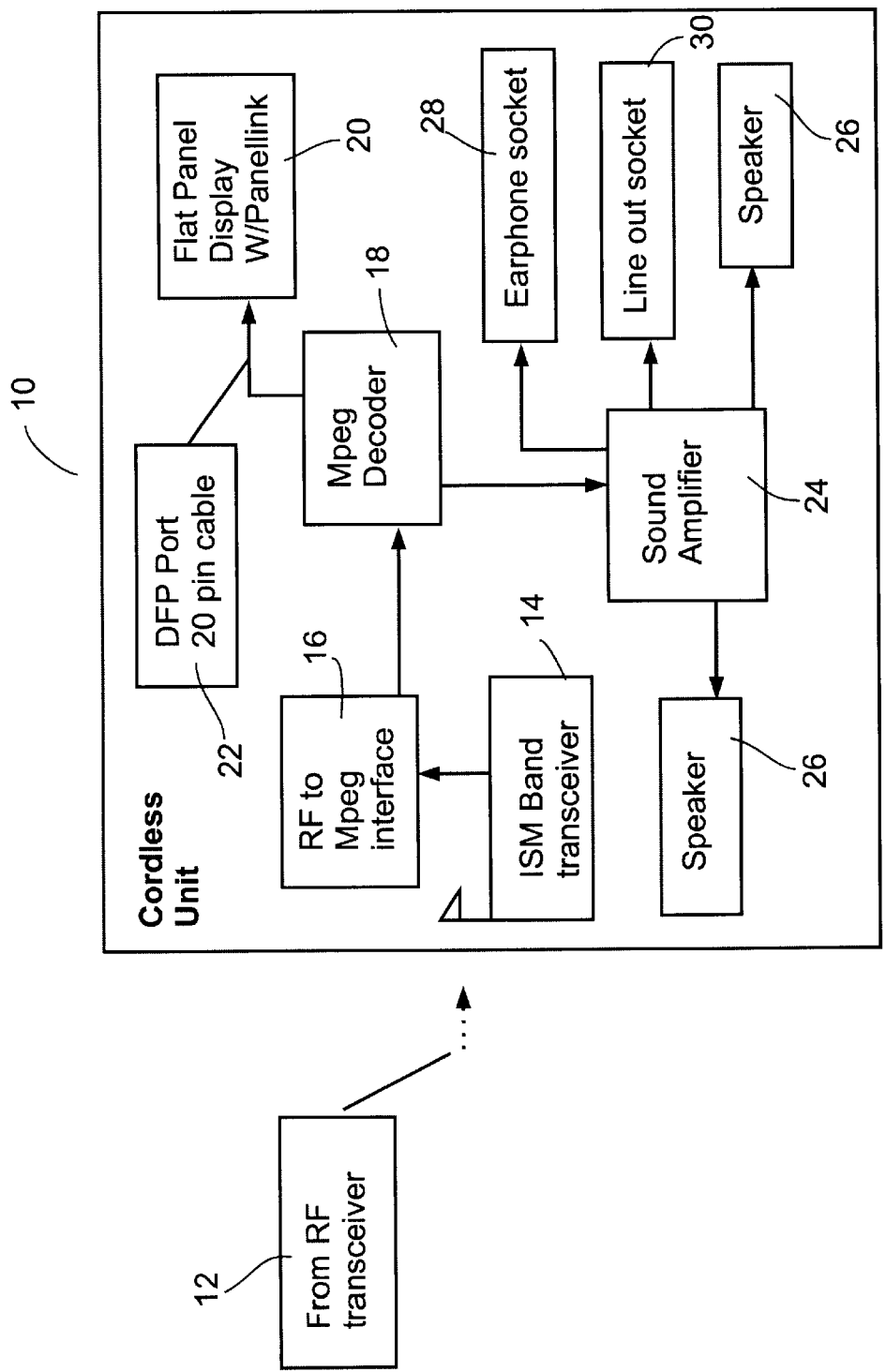
FIG. 2 is a schematic block diagram illustrating an exemplary wireless multimedia platform monitor according to the present invention.

FIG. 2 is a schematic block diagram illustrating an exemplary wireless monitor according to the present invention, for displaying the multimedia data from the computer (not shown), preferably including at least video data and audio data, and more preferably including video and audio data together. The wireless monitor is optionally and preferably used with the detached computers for decompressing the multimedia data according to the present invention, which include various components for compressing the data before transmission to the wireless monitor, preferably according to the system and method of FIGS. 1A and 1B respectively.

A wireless monitor 10 is connected to a radiofrequency (RF) transceiver 12, which communicates with a main computer (not shown) through radiowave communication. Wireless monitor 10 preferably displays both audio and visual data although wireless monitor 10 could optionally display only audio or only visual data. Hereinafter, the term "display" can include both a visual display and an audio display.

Wireless monitor 10 preferably includes an ISM band transceiver 14 for receiving radiowave communication from the main computer, and for transmitting such radiowave communication to the main computer. More preferably, all of the radiowave receivers and transmitters of the present invention operate as low-frequency radiowaves, most preferably in the range of from about 2.4 GHz to about 5.8 GHz, as this range does not require a special license in the United States of America.

ISM band transceiver 14 is preferably connected to a radiofrequency conversion interface 16, for converting the radiowaves to video stream data. Preferably, conversion interface 16 converts the radiowaves to such video data in the MPEG format although of course a different format could alternatively be used. The data is then decoded by a decoder 18, which provides the video portion of the data to a display screen 20. Optionally and preferably, display screen 20 receives this data through a DFP (digital flat panel display) port 22. Also optionally and preferably, display screen 20 is a flat panel display, although of course other types of display screens could also be used. Examples of display screen 20 include but are not limited to any type of flat screen including a plasma screen or an LCD (liquid crystal display), a CRT (cathode ray tube) monitor, a computer monitor or any other type of video display monitor. Thus, wireless monitor 10 enables visual data such as a GUI (graphical user interface), other graphics or images, or a video stream, to be displayed to the user.

Decoder 18 also optionally and preferably provides the audio portion of the decoded data to a sound amplifier 24. Sound amplifier 24 is connected to some type of audio playing device, such as a speaker 26, an earphone socket 28, or a line-out socket 30 as shown.

Preferably, wireless monitor 10 receives power through a battery which is optionally chargeable at a charger/base (not shown), thereby enabling wireless monitor 10 to be portably transported for displaying video and/or audio data at various remote locations.

Figure 3A:
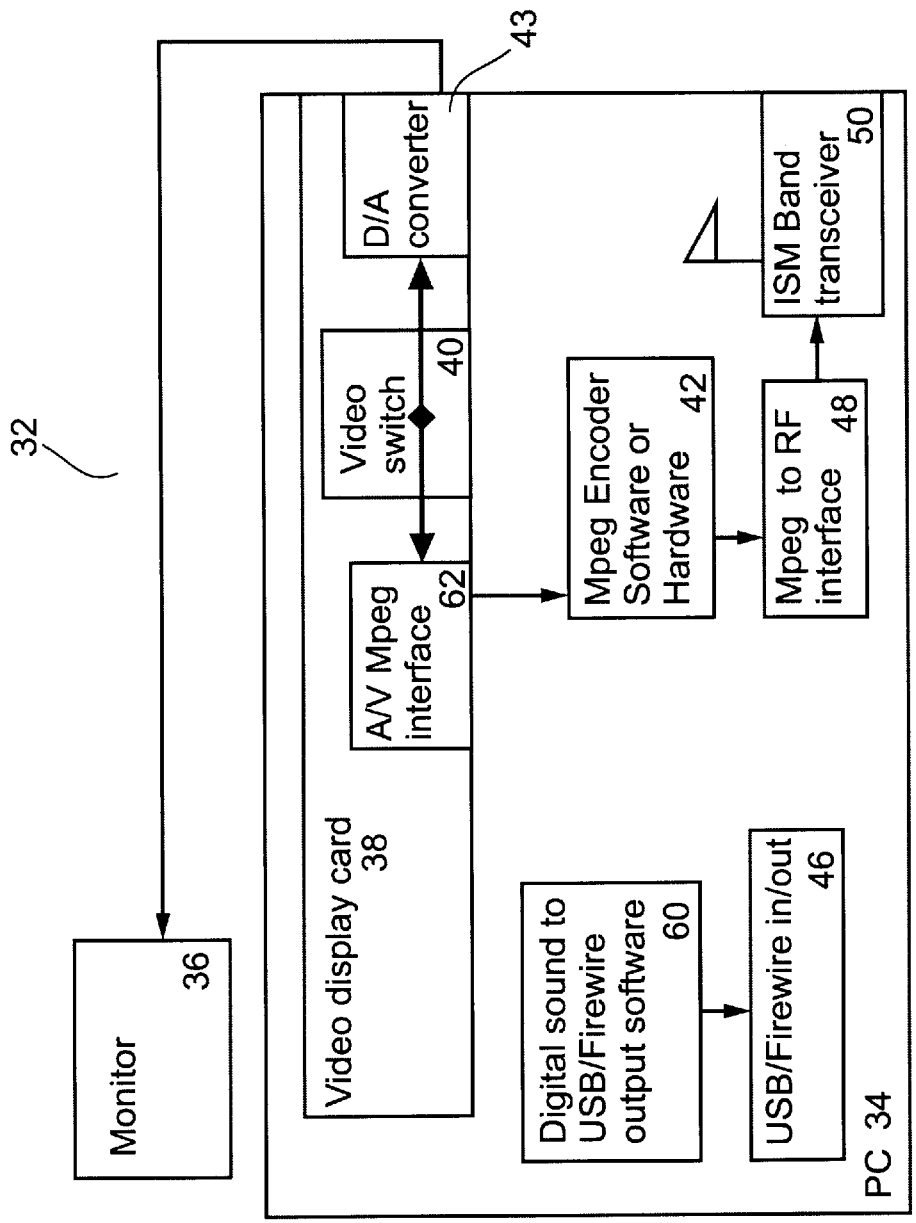
FIGS. 3A–3C are schematic block diagrams which illustrate three different embodiments of a complete wireless system according to the present invention.
Figure 3B:
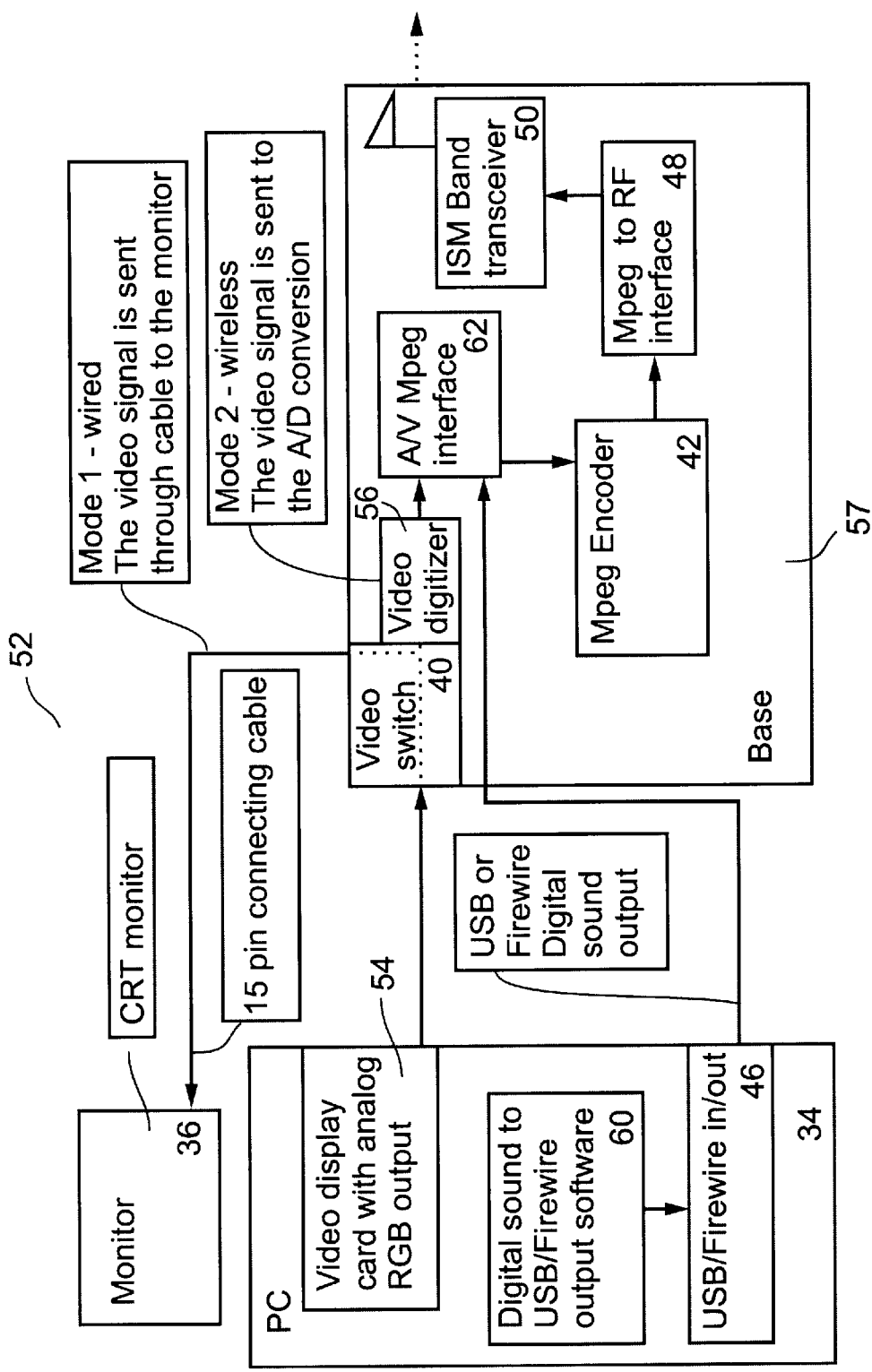
Figure 3C:
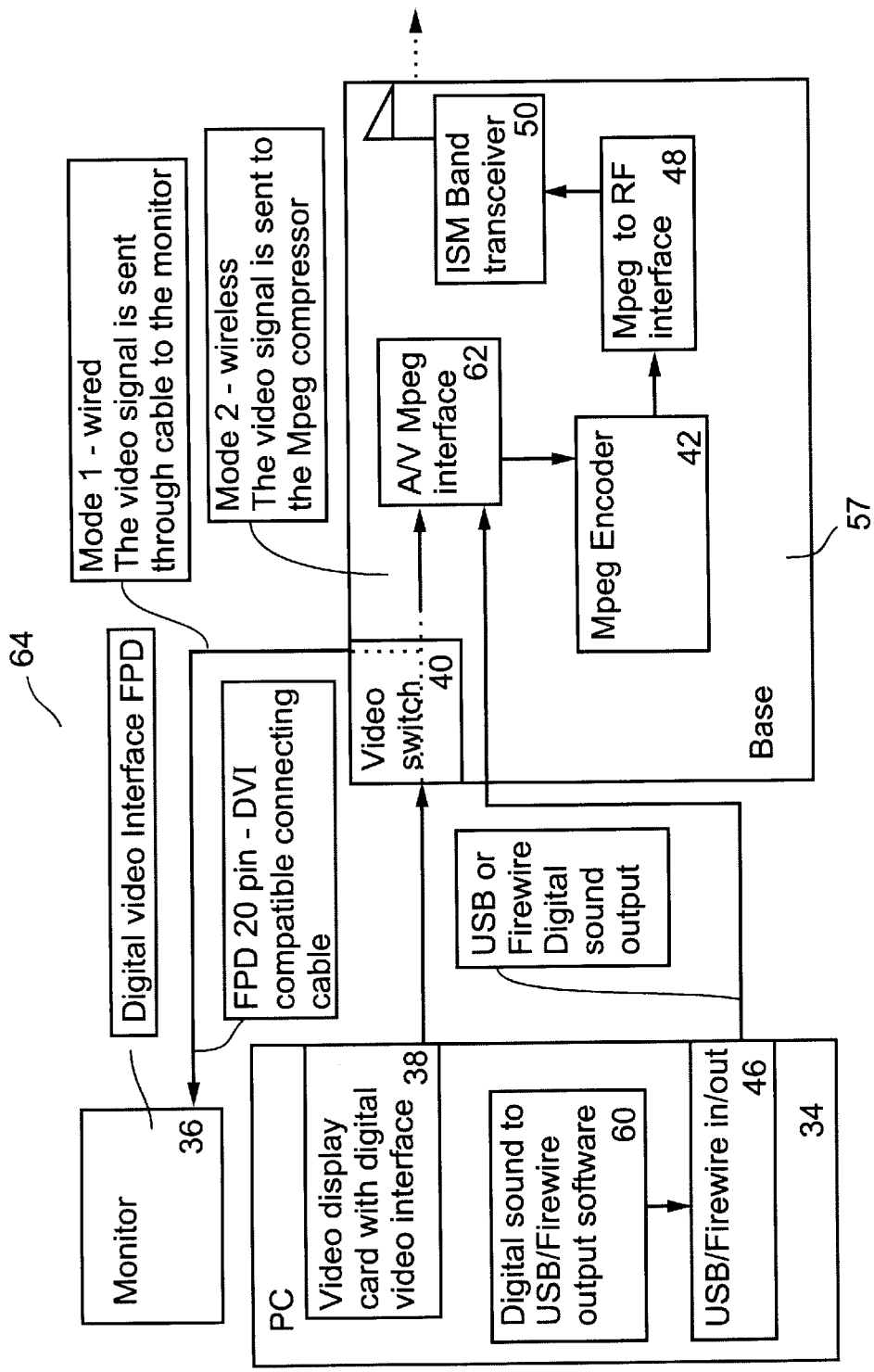

FIGS. 3A–3C are schematic block diagrams of exemplary configurations of wireless monitor 10 and a main computer for communicating with wireless monitor 10 of FIG. 2 in order to provide the multimedia data, such as video and/or audio data for display by wireless monitor 10. These configurations preferably perform the method for compression of multimedia data according to the present invention, as described with regard to FIGS. 1A and 1B.

FIG. 3A shows a first exemplary system 32 which is an internal implementation, in which the components of the multimedia compression system are contained within a main computer 34. As shown, main computer 34 is connected to the wireless monitor (not shown) and to a local monitor 36, which is optionally connected to main computer 34 with a cable. Main computer 34 features a video display card 38 with DVI (digital output) or DSP, which is connected to a video switch 40. In the embodiment shown, video switch 40 is contained within main computer 34, and is preferably connected to both local monitor 36 and to an MPEG encoder 42, such that the video signals are either displayed locally, at local monitor 36, or else are encoded for remote transmission by MPEG encoder 42. For local display at local monitor 36, preferably the signals are fed through a D/A converter 43.

It should be noted that MPEG encoder 42, which may be embodied as software, firmware or hardware, may encode the video data according to a different data format. MPEG encoder 42 optionally and preferably receives the video signals from an AIV-MPEG interface 62, which is more preferably located on video display card 38, and which converts the video signals from a format which is suitable for video display card 38 to a format which is suitable for MPEG encoder 42.

MPEC encoder 42 also optionally and preferably receives audio input from an audio encoder 44 which converts the audio data into a format which is readable by MPEG encoder 42. MPEG encoder 42 then transmits the combined audio and video data to a converter 48. Converter 48 converts the combined data into radiowaves, which are then transmitted by an ISM band SP$^2$ transmitter 50 for transmitter radiowaves to he wireless monitor (not shown).

In addition, the audio data is passed as digital audio signals to a USB and/or Firewire output device driver 60, which sends the audio data to a USB and/or Firewire port 46 for combining with the video data to converter 48.

A system 52 shown in FIG. 3B is similar to that of FIG. 3A, except that the implementation is now external to main computer 34, and a video display card 54 now has an analog RGB output directly to video switch 40. Video switch 40 and the other multimedia compression and transmission components are now located at a separate base 57, which is separate from main computer 34.

Video switch 40 passes the analog video data to a video digitizer and converter 56, which passes the data to A/V-MPEG interface 62. MPEG interface 58 passes the data to MPEG encoder 42, and from there to converter 48 and transceiver 50, as previously described.

As for FIG. 3A, the audio data is passed as digital audio signals to a USB and/or Firewire output device driver 60, which sends the audio data to a USB and/or Firewire port 46 for combining with the video data at A/V-MPEG interface 62.

FIG. 3C shows a system 64 which is a second external implementation, in which the multimedia compression and transmission components are also located at separate base 57. However, these components are now implemented for digital video signals, as for FIG. 3A, rather than for the analog signals of FIG. 3B.

Therefore, the device of the present invention provides complete interactivity with a main computer at a remote location, without necessarily requiring a network card and without a physical wire or cable connection. The interactivity is provided through a remote A/V display device and a remote input platform, both of which lack a CPU. Thus, the main computer controls the actions of the remote A/V display device according to instructions received from the remote input platform.

Furthermore, the method of compressing the audio and/or visual stream data according to the present invention also provides for the rapid transmission of the data, since the type of compression is selected according to the type of application which generated the video stream data, and hence according to the particular characteristics of this data.

While the invention has been described with respect to a limited number of embodiments, it will be appreciated that many variations, modifications and other applications of the invention may be made.

What is claimed is:

1. A method for compressing display data, according to a compression method, the method comprising:

provlding a plurality of different display data compression profiles, each of said compression profiles being associated with a plurality of characteristics of a type of the display data, wherein the compression method is adjusted according to said plurality of characteristics of said type of the display data to form an adjusted compression method;

receiving the display data to be compressed to form received data;

determining at least one characteristic of said type of said received data;

selecting a profile according to said at least one characteristic; and compressing said received data with said adjusted compression method according to at least one parameter determined according to the characteristics of said received data, and wherein said compression method allows adjusting of at least one of a number of intra-frames, bidirectional frames, or predictable frames.

2. The method of claim 1, wherein said determining at least one characteristic of said type of said received data comprises:

sampling a plurality of groups of rasters of said received data;

determining at least one parameter for said plurality of groups of rasters; and determining said at least one characteristic according to said at least one parameter.

3. The method of claim 2, wherein said at least one parameter is selected from the group consisting of a number of unique colors in the screen, a presence of static dark thin rows of pixels or large static blocks, and a level of motion in the screen between one frame and the next frame.

4. The method of claim 3, wherein said compression profile is adjusted according to a factor selected from the group consisting of maximum resolution, refresh rate and color handling.

5. The method of claim 1, wherein said compressing is performed according to an MPEG compression procedure.

6. The method of claim 1, wherein the display data is compressed for a user, and said selecting said profile further comprises:

overriding a selection of said profile by said user; and substituting a different profile according to a selection by said user.

7. The method of claim 1, wherein said providing said plurality of different display data compression profiles includes:

analyzing each type of display data to determine at least one characteristic of each type of said received data; and associating one of said plurality of different display data compression procedures with each type of display data according to said at least one characteristic for optimal compression of the display data to form said compression profile.

8. The method of claim 1, wherein said selecting said profile further comprises:

sampling a plurality of rasters of said received data.

9. The method of claim 1, wherein said video display data comprises video game video display data.

10. The method of claim 1, wherein said video display data comprises television video display data.

11. A method for compressing display data in a system wherein the user interface comprises a remote monitor, the display data being displayed on the remote monitor in a form of video display data, the method comprising:

analyzing each type of video display data to determine at least one characteristic of each type of video display data;

associating one of a plurality of different video data compression profiles with each type of video display data according to said at least one characteristic for optimal compression of the video display data to form said compression profile;

receiving the video display data for compression to form received data;

selecting said compression profile for compressing said received data, comprising:

determining at least one characteristic of said type of said received data; and selecting a profile according to said at least one characteristic of said type of said received data; and compressing said received data with a compression method adjusted according to said compression profile, wherein said compression method allows adjusting of at least one of a number of intra-frames, bidirectional frames, or predictable frames.

12. The method of claim 11, wherein said selecting said compression profile is performed manually.

13. The method of claim 11, wherein said selecting said compression profile is performed automatically.

14. The method of claim 11, wherein said determining at least one characteristic of said type of said received data comprises:

sampling a plurality of groups of rasters of said received data;

determining at least one parameter for said plurality of groups of rasters; and determining said at least one characteristic according to said at least one parameter.

15. The method of claim 14, wherein said at least one parameter is selected from the group consisting of a number of unique colors in the screen, a presence of static dark thin rows of pixels or large static blocks, and a level of motion in the screen between one frame and the next frame.

16. The method of claim 15, wherein said compression profile is adjusted according to a factor selected from the group consisting of maximum resolution, refresh rate and color handling.

17. The method of claim 11, wherein said compression procedure comprises an MPEG compression procedure.

18. The method of claim 11, wherein said at least one characteristic of said received data is a type of a software application for generating the video display data, such that said selecting said profile is performed by selecting said profile according to said type of said software application.

19. The method of claim 18, wherein said software application is operated by an operating system, such that an identity is provided by said operating system.

20. The method of claim 11, wherein said video display data comprises video game video display data.

21. The method of claim 20, wherein said video game video display data comprises three-dimensional video game video display data.

22. The method of claim 11, wherein said video display data comprises television video display data.

23. The method of claim 22, wherein said television video display data comprises three-dimensional television video display data.

24. The method of claim 11, wherein said selecting said profile further comprises:

sampling a plurality of rasters of said type of received data to determine said at least one characteristic of said type of said received data.

25. A method for compressing bitmap data, the bitmap data comprising at least one bitmap, the method comprising:

providing a plurality of different bitmap data compression profiles, each of said compression profiles being associated with a plurality of characteristics of the bitmap data;

receiving the bitmap data to be compressed to form received data;

determining at least one characteristic of said received data;

selecting a profile according to said at least one characteristic; and compressing said received data according to at least one parameter determined by said profile, wherein said compressing is performed according to a compression procedure that allows adjusting of at least one of a number of intra-frames, bi-directional frames, or predictable frames.

26. A method for compressing display data for transmission to a wireless remote monitor, the method comprising:

providing a plurality of different display data compression profiles, each of said compression profiles being associated with a plurality of characteristics of the display data;

receiving the display data to be compressed to form received data;

determining at least one characteristic of said received data;

selecting a profile according to said at least one characteristic;

compressing said received data according to at least one parameter determined by said profile, wherein said compressing is performed according to a compression procedure that allows adjusting of at least one of a number of intra-frames, bi-directional frames, or predictable frames; and transmitting said received data to the wireless remote monitor.

* * * * *